United States Patent

[11] 3,581,097

[72] Inventors Masao Hibi;
Takeshi Nishimura, Kodaira-Shi, Japan
[21] Appl. No. 622,773
[22] Filed Mar. 13, 1967
[45] Patented May 25, 1971
[73] Assignee Hitachi, Ltd.
Tokyo, Japan
[32] Priority Mar. 16, 1966
[33] Japan
[31] 41/15,762

[54] SOLID-STATE IMAGE PICKUP DEVICE
7 Claims, 4 Drawing Figs.

[52] U.S. Cl. .......... 250/209, 178/7.1, 250/220, 315/169
[51] Int. Cl. .......... H01j 39/12, H04n 3/14
[50] Field of Search .......... 250/203, 209, 214, 219 (CR), 211, 220; 313/65, 66, 94, 96; 315/149, 154, 155, 167, 169; 178/7.1; 307/253

[56] References Cited
UNITED STATES PATENTS
3,333,106 7/1967 Fischer .......... 250/214
3,348,064 10/1967 Powlus .......... 307/311X
3,488,508 1/1970 Weimer .......... 250/211

OTHER REFERENCES

Philco Application Lab Report 518 500 kc gating of 30 mc sine wave by Robert W. Carney Optoelectronic Devices and Circuits by Samuel Weber McGraw-Hill, 1964 Pages 179—181 Article by R. W. Windebank Handbook of Semi-conductor Electronics by Lloyd P. Hunter McGraw-Hill, 1962 Pages 11—74 and 11—75

*Primary Examiner*—Roy Lake
*Assistant Examiner*—E. R. La Roche
*Attorney*—Craig, Antonelli, Stewart & Hill

ABSTRACT: The solid-state image pickup device is equipped with a radiation-sensitive surface formed with a plurality of radiation-sensitive elements disposed in a matrix form, two groups of conductive strips for impressing scanning pulses to said radiation-sensitive elements, first scanning-pulse-distributing means connected to one of said two groups of conductive strips, second scanning-pulse-distributing means connected, via transistors having switching action, to the other of said two groups, and a detector for deriving, as electric signals, the changes in the characteristics of said radiation-sensitive elements.

INVENTORS
MASAO HIBI
TAKESHI NISHIMURA

BY Paul M. Craig, Jr.
ATTORNEY

INVENTORS
MASAO HIBI
TAKESHI NISHIMURA

BY Paul M. Craig, Jr.
ATTORNEY

SOLID-STATE IMAGE PICKUP DEVICE

The present invention relates to a solid-state image pickup device, and more particularly to a solid-state image pickup device adapted to convert radiations images, such as visible light rays, X-rays, thermal rays which radiate energy, to electrical signals and to derive said electrical signals in the form of time-sequential signals.

Conventional solid-state image pickup devices are represented by their structure which comprises a plurality of radiation-sensitive elements, for example, photoconductors, which are disposed in one plane in matrix panel form and two or more, usually two, orthogonally arranged sets of uniformly spaced parallel conductors disposed so as to position said radiation-sensitive elements between said crosswisely arranged two sets of conductors at the apparent intersections thereof, each set of conductors being connected to switching means, said devices being operative in such manner that by appropriately turning said switching means "on" or "off," the impedance variations of said radiation-sensitive elements located at the cross points of said conductors are detected in terms of electrical signals. Devices embodying this theory are known. As the aforesaid switching means, on the other hand, mechanical switches and optoelectronic switches, i.e. photoelectronic switches using photoconductors, are known. Switching means of these prior types have merits and demerits of their own. Because of the fact that there has not been proposed any switching means which can satisfy requirements that the switching means is operable at high speed, that it has a superior signal-to-noise characteristic and that it is simple in structure, solid-state image pickup devices have not been placed in practical use as yet.

It is, therefore, an object of the present invention to provide a solid-state image pickup device which can derive a signal with a good signal-to-noise characteristic.

Another object of the present invention is to provide a solid-state image pickup device which can effect scanning at high speed.

Still another object of the present invention is to provide a solid-state image pickup device of an extremely compact size which is not only simple in structure but also can be fabricated with an integrated structure.

In order to attain the foregoing objects, the device of the present invention comprises a plurality of radiation-sensitive elements disposed in one plane in matrix panel form, orthogonally arranged sets of conductive strips positioning said radiation-sensitive elements therebetween, a first delay line for distributing a scanning pulse voltage to the conductive strips of one of said two sets, transistor switches equipped with switching action control terminals and provided for each conductive strip of the other of said two sets, a second delay line for distributing another scanning pulse voltage and provided for said switching action control terminals of said transistors, and a detecting means for deriving electrical signals, the variations of characteristics of said radiation-sensitive elements located at the cross points of said orthogonally arranged conductive strips when said elements are impressed with said voltages coming from said first and said second delay lines, respectively. This device of the present invention has the advantages that the switching action of the aforesaid transistors is effected at an extremely high speed and also that because the unactuated transistors remain in a complete cutoff state, the derived signals have an excellent signal-to-noise characteristic.

The above and other objects as well as the attendant advantages of the present invention will become more apparent by reading the following description in conjunction with the accompanying drawings, in which.

Figure 1:
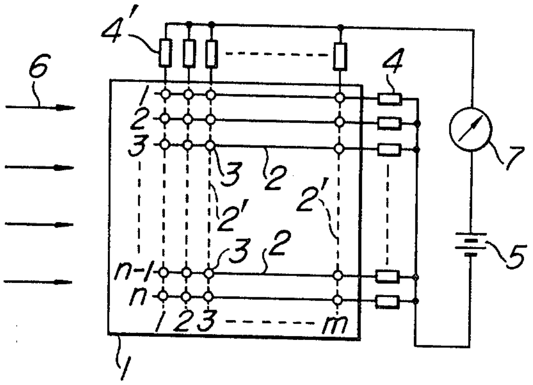
FIG. 1 PRIOR ART
FIG. 1 is a diagram showing one example of the conventional solid-state image pickup devices.

In the drawings, FIG. 1 is a diagram showing one example of the conventional solid-state image pickup devices having radiation-sensitive elements disposed in $n$ lines and $m$ rows. Reference numeral 1 represents a base panel. Numerals 2 and 2′ represent orthogonally disposed groups of conductive strips, respectively, and numeral 3 represents one of the radiation-sensitive elements (hereinafter to be referred to merely as sensitive elements) interposed between said sets of conductive strips. These sensitive elements are disposed on a base panel 1 in matrix form. Numerals 4 and 4′ represent changeover switches for the two groups of conductive strips, respectively. Numeral 5 represents a DC power source. Numeral 6 represents an incident radiation, and numeral 7 represents a radiation-sensitive current detector (signal current detector).

The solid-state image pickup device having the foregoing structure is operative in such a manner that the respective sensitive elements undergo changes in their characteristics such as their resistance values in accordance with the intensity of the incident radiation 6. Now, by shifting, successively from one to another, the connection of the conductive strip changeover switches 4 and 4′ which are connected to the respective sensitive elements in series and thereby impressing the respective sensitive elements disposed on the base panel 1 with a voltage coming from the DC power source, a signal corresponding to the change in the characteristic of the sensitive elements 3 can be derived from the signal current detector 7.

The most important requirements with the solid-state image pickup device of the foregoing structure concern the functional ability of the switches 4 and 4′ intended for the changeover of the connection to the conductive strips. More specifically, in order to successively impress the respective sensitive elements disposed on the base panel 1 with a voltage (this operation is called scanning), it is mandatory that the changeover switches act at high speed. Another important requirement rests with the nature of the signal-to-noise characteristic obtained from the device. These factors have constituted a serious obstruction in the utility of solid-state image pickup devices. There has been proposed a mechanical switch for use in the connection to the conductive strips. While this type of switch is outstandingly satisfactory with regard to the signal-to-noise characteristic of the derived signal, it is of little utility because of its complicated structure, high cost, difficulty in fabricating in a compact size, limited life duration and especially in the lack of speed of operation. There has been also proposed a photoelectronic switch utilizing a photoconductor so as to effect on-off action by means of light. However, this latter type bears a shortcoming that it is very poor in the signal-to-noise characteristic of the derived signal. This photoelectronic-type switch will now be discussed in connection with the equivalent circuit diagram in FIG. 2.

Figure 2:
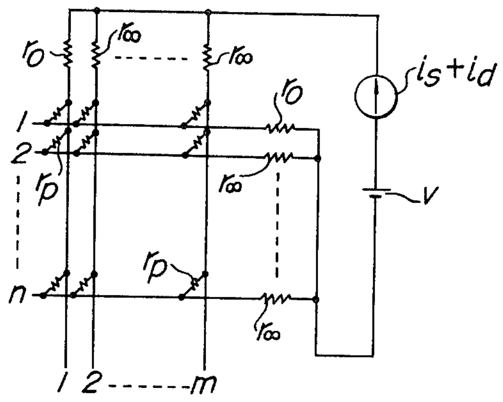
FIG. 2 is a diagram showing an equivalent circuit of the device in FIG. 1.

In FIG. 2, $r_o$ and $r_\infty$ represent the resistances when the photoelectronic switches are rendered on and off, respectively. For the sake of simplicity, let us assume that all of the radiation-sensitive elements have a resistance value of $r_p$ under a certain condition. Now, let us also assume that in the event a voltage $V$ is impressed to this circuit, a signal current $i_s$ is delivered by the sensitive element located at the cross point between the conductive strips connected to the changeover switches which are in the "on" state, and that $i_d$ represents the total sum of the currents which are dark currents (noise) passing through the remaining channels, said $i_s$ and $i_d$ values are derived by the following equations:

$$i_s=\frac{V}{r_p+2r_o} \quad (1)$$

$$i_d=\frac{V}{r_p+r_o+r_\infty}\{(n-1)+(m-1)\}+\frac{(n-1)(m-1)V}{r_p+2r_\infty} \quad (2)$$

If, for example, $r_o$=0, $r_\infty$=100KΩ, $r_p$=10KΩ, and $n$=$m$=101 in said equations (1) and (2), $$i_s = \frac{V}{10} \quad (3)$$

$$i_d = \frac{200V}{110} + \frac{10,000V}{210} \quad (4)$$

Accordingly, $$i_s/i_d = 2\times10^{13} \quad (5)$$

As is clear from the equation (5), the signal-to-noise characteristic is very poor and for this reason this type of device has been of little utility.

The present invention will now be described in detail.

Figure 3:
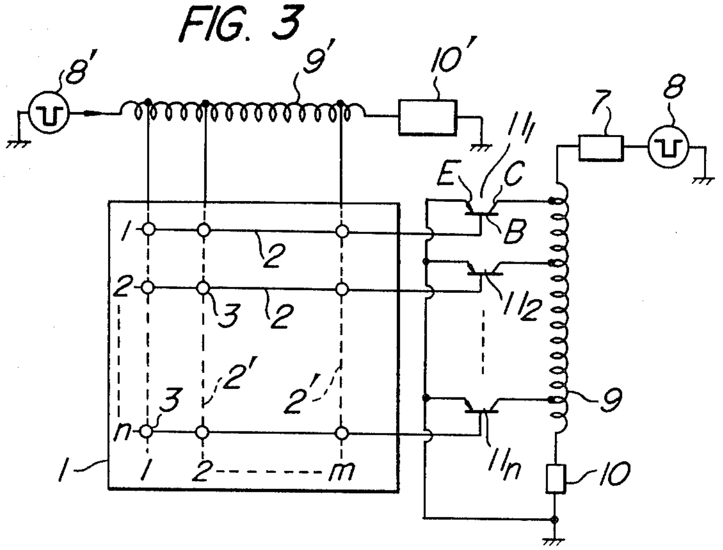
FIGS. 3 and 4 are schematic structural diagrams, respectively, showing a couple of examples of the present invention.

FIG. 3 is a diagram showing one embodiment of the present invention, in which reference numeral 1 represents a base panel; numerals 2 and 2′ represent orthogonally arranged groups of conductive strips (these will hereinafter to be referred to as the first and the second groups of conductive strips, respectively); numeral 3 represents one of the sensitive elements disposed in matrix form; numeral 7 represents a responsive current detector; numerals 8 and 8′ represent scanning pulse generators, respectively; numerals 9 and 9′ represent delay lines, respectively, with said conductive strips of the group 2′ being connected to the taps of the delay line 9′; numerals 10 and 10′ represent terminal impedances, respectively; numerals $11_1$, $11_2$, ....., $11_n$ represent transistor switches (hereinafter to be referred to simply as TRS), respectively, with their bases B being connected to the conductive strips of the first group, respectively, and their collectors C being connected to the taps of the delay line 9, respectively.

Description will next be directed to the action of the device having the foregoing structure. The delay time for each of the delay lines 9 and 9′ is set so that the scanning pulse voltages supplied from the driving power sources 8 and 8′ or the pulse generators can be impressed successively to their corresponding sensitive elements 3 one after another. Let us now assume that a pulse voltage is supplied to, for example, the first conductive strip of the second group 2′ of conductive strips. Then, currents pass through the sensitive element 3 located on the first conductive strip 2′ corresponding to the respective different characteristics of these elements 3 so that the currents flow into the bases B of the respective TRS $11_1$, $11_2$, ....., $11_n$. In the event, however, that no voltage is impressed on the collectors C of these TRS, there is no current that flows into the responsive current detector 7. In the event that a pulse voltage is impressed on the collector C of, for example, TRS $11_2$, said TRS $11_2$ is actuated, and the current passing through the sensitive element 3 located at the cross point of lines 2 and 1 on the base panel 1 is converted to an electrical signal corresponding to the intensity of the input radiation. This signal, after being amplified by the TRS $11_2$, is detected by the responsive current detector 7. The impedance between the base and the collector of each TRS is much higher than that between its base and emitter, and for this reason, the dark currents flowing into those TRS other than the TRS $11_2$ are all channeled to their bases, with the result that only the required signal is amplified by the TRS $11_2$ and is delivered to the responsive current detector 7 connected to the collector circuits. Accordingly, these transistors function as ideal on-off switches and because of their amplifying action, the derived signal has an excellent signal-to-noise characteristic.

Figure 4:
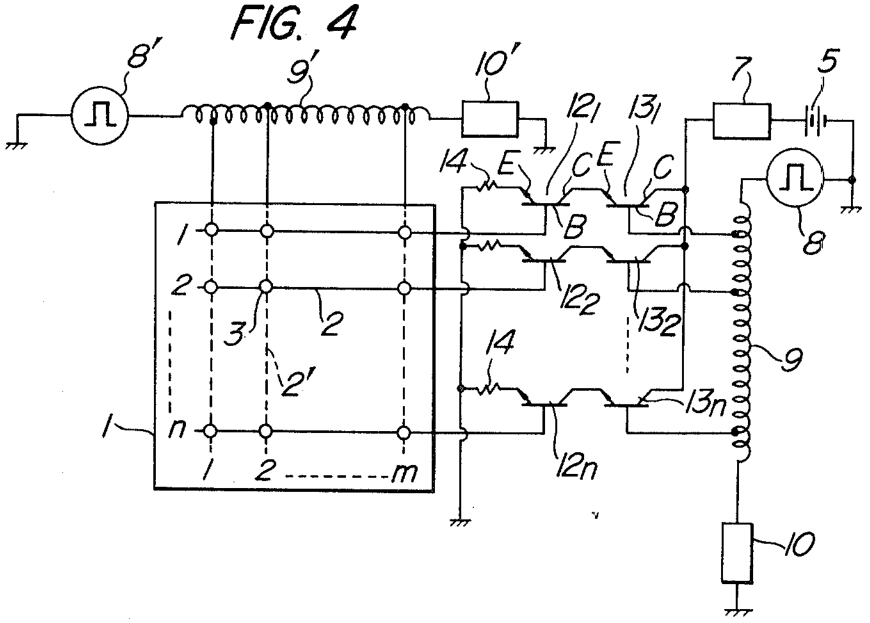

FIG. 4 shows still another embodiment of the present invention. The reference numerals represent like parts shown in FIG. 3. Numerals $12_1$, $12_2$, ......, $12_n$ and numerals $13_1$, $13_2$, ....., $13_n$ represent TRS's, respectively. As illustrated, each of two transistors connected in series in two groups constitute a pair, respectively. Numeral 14 represents a minute resistor interposed between the TRS 12 and earth, and is adapted to compensate for the variance of the characteristic of TRS 12, and therefore, the use of this resistor is not mandatory. In this instant example, however, TRS $12_1$, $12_2$, ......, $12_n$ function so as to amplify the signal current, and for this reason, there arises a need to make their characteristic patterns uniform to some extent, and hence the use of the minute resistors. However, TRS $13_1$, $13_2$, ....., $13_n$ are intended for the mere on-off performance, and therefore, there is no acute need for making their characteristic patterns uniform. Furthermore, there is another advantage that the pulse generator 8 can have a small power capacity, because of the fact that this example employs the system where the pulse voltage is impressed on the base B of the TRS 13.

In FIG. 3, which illustrates one embodiment of the invention, is shown a device using a PNP type TRS, while in FIG. 4 representing another embodiment is illustrated a device where NPN-type transistors are used. The present invention is not restricted to either one of them, but it should be understood that the objects of the present invention can be attained by the use of any one of PNP type and NPN type of transistors. In the foregoing embodiments, the present invention has been described chiefly on the solid-state image pickup devices incorporating photoelectronic-type sensitive elements. Besides this type of element, it is well known that photovoltaic-type radiation-sensitive materials can also be used as the radiation-sensitive elements. It should be understood also by those skilled in the art that where elements of this latter type are employed, field-effect-type transistors (FET) having a high input impedance are used in lieu of the TRS switches, since it is difficult to derive a current from the photovoltaic-type element.

It can be understood from above explanations that, the present invention makes possible a high-speed scanning of the sensitive elements disposed on the base panel and also makes the signal-to-noise characteristic of the signal derived by the responsive current detector excellent. Furthermore, the present invention can be easily produced when it is intended to fabricate a solid-state image pickup device of a compact size by the use of the so-called integrated circuit techniques. Thus, the present invention has a number of advantages and far improved practicability.

It should be understood that the foregoing embodiments are illustrated strictly by way of example, and that the invention is not restricted thereto, and also that various modifications may be made by those skilled in the art without departing from the spirit of the invention.

What we claim is:

1. A solid-state image pickup device comprising: a base panel having a plurality of radiation-sensitive elements disposed in matrix form; first and second groups of conductive strips with said radiation-sensitive elements disposed therebetween; first scanning-voltage-distributing means connected to said second group for selectively distributing a scanning voltage thereto; a plurality of transistors having switch action control terminals respectively, each said control terminal being connected to each one of said first groups of conductive strips; second scanning-voltage-distributing means connected to said transistors for selectively distributing a scanning voltage thereto; and signal-detecting means for deriving electrical signals resulting from changes in the impedance characteristics of said radiation-sensitive elements.

2. A solid-state image pickup device according to claim 1, wherein each said switch action control terminal corresponds to a base of one of said transistors, each collector of said transistors being connected to a point on said second scanning-voltage-distributing means, their emitters being connected to the other side of said second scanning-voltage-distributing means.

3. A solid-state image pickup device comprising: a base panel having a plurality of radiation-sensitive elements disposed in matrix form; first and second groups of conductive strips with said radiation-sensitive elements disposed therebetween; first scanning-voltage-distributing means connected to said second group of conductive strips for selectively distributing a scanning voltage thereto; a plurality of first transistors, each base of which is connected to each one of said first groups of conductive strips; a plurality of second transistors coupled to said first transistors respectively; second scanning-voltage-distributing means connected to each base of said second transistors for selectively distributing a scanning voltage thereto; and signal-detecting means coupled to said second transistors, thereby deriving electrical signals resulting from charges in the impedance characteristics of said radiation-sensitive elements.

4. A solid-state image pickup device according to claim 3, wherein compensating resistors are connected to the emitters of said first transistors, respectively.

5. A solid-state image pickup device comprising a base panel having a plurality of radiation-sensitive elements disposed in matrix form, first and second groups of orthogonally disposed conductive strips with said elements disposed therebetween, a first scanning pulse source connected to a first delay line, said said first group of conductive strips being connected at spaced points along said first delay line, a second scanning pulse source connected to a second delay line, a transistor amplifier switch for each respective conductive strip of said second group of conductive strips having its input connected to the strip and its output connected to a point along said second delay line, and signal-detecting means connected between said second scanning pulse source and said second delay line for deriving electric signals resulting from changes in the impedance characteristics of said elements.

6. A solid-state image pickup device as defined in claim 5 wherein said transistor amplifier switches each include a transistor having its base electrode connected with a respective one of said second group of conductive strips, its collector electrode connected to a point on said second delay line, and its emitter electrode connected to the other side of said second scanning pulse source.

7. A solid-state image pickup device as defined in claim 5 wherein said transistor amplifier switches each include a plurality of first transistors each having its base electrode connected with a respective one of said second group of conductive strips and its emitter electrode connected to the other side of said second scanning pulse source, and a plurality of second transistors each having its base electrode connected to a point on said second delay line, its collector electrode connected to a DC bias source and its emitter electrode connected to the collector electrode of a respective first transistor.